Oct. 27, 1931.  C. J. BEAVER  1,829,580
CONDUIT FOR LAYING ELECTRIC CABLES
Filed Feb. 2, 1928   2 Sheets-Sheet 1
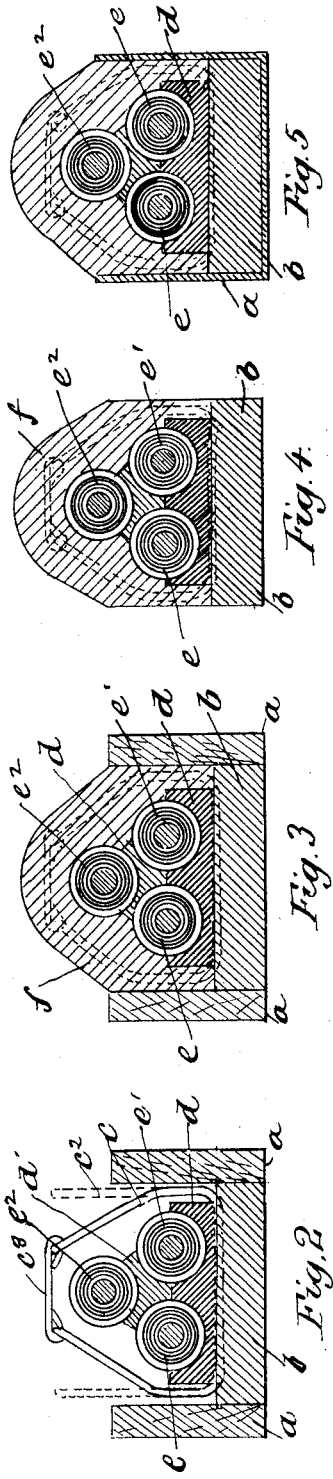
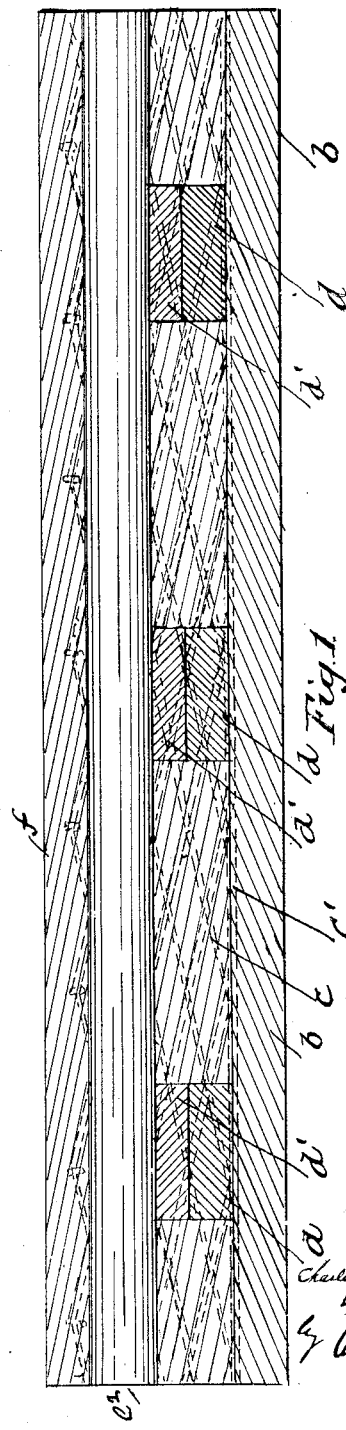

Oct. 27, 1931.  C. J. BEAVER  1,829,580
CONDUIT FOR LAYING ELECTRIC CABLES
Filed Feb. 2, 1928  2 Sheets-Sheet 2

Inventor
Charles James Beaver.
by Connolly Bros
Attys

Patented Oct. 27, 1931

1,829,580

UNITED STATES PATENT OFFICE

CHARLES JAMES BEAVER, OF BOWDON, ENGLAND, ASSIGNOR TO W. T. GLOVER AND COMPANY LIMITED, OF MANCHESTER, ENGLAND

CONDUIT FOR LAYING ELECTRIC CABLES

Application filed February 2, 1928, Serial No. 251,278, and in Great Britain February 5, 1927.

This invention has reference to troughs or conduits for the laying of electric cables. For many years it has been the practice to make asphalt troughs for the purpose in short lengths rectangular in cross section, to lay these along the trench prepared for the cable, by applying heat at their abutting ends to make the sections homogenous throughout, after the conductor has been laid therein to fill the trough nearly to the top with molten bitumen, and finally when the bitumen has solidified to fill up the trough to overflowing with asphaltic concrete, and by applying heat, make this homogenous with the sides of the trough. In some cases where more than one cable is laid in one trough, distance pieces are placed at regular intervals between the cables to locate them relatively, or transverse bridge pieces are inserted in the trough at regular intervals for the cables to seat upon.

For the purpose of high voltage cables operating at voltages of say, 33000 volts and upwards it is frequently desirable to lay single core cables, when it is required to lay, say three such cables in one trough. In these cases for known electrical reasons it is desirable that the cables shall be laid symmetrically in relation to one another, that is to say in the case of three shall in cross section be at the apices of an equi-lateral triangle.

The object of this invention is to construct the trough in a manner cheaper and at the same time more efficient than the manner now in vogue, and a further object is to locate several cables in one trough in the desired relative position.

According to this invention we make a trough and lay and embed the cables therein in a manner as hereinafter described in reference to the accompanying drawings.

Figure 1 is a longitudinal central vertical section of the finished troughing containing three single core cables and showing the upper one in elevation. Figure 2 is a cross section of the conduit before the conductors have been embedded in the molten asphalt. Figure 3 is a like section after the cables have been embedded in the molten asphalt. Figure 4 is a like section of the final form after wooden formers have been removed. Figure 5 is a like section as Figure 2 with a metal former left in position.

Figure 6:
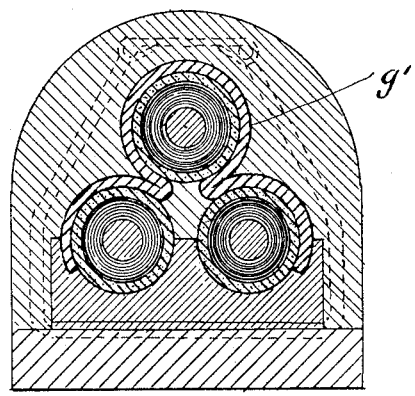
Figure 7:
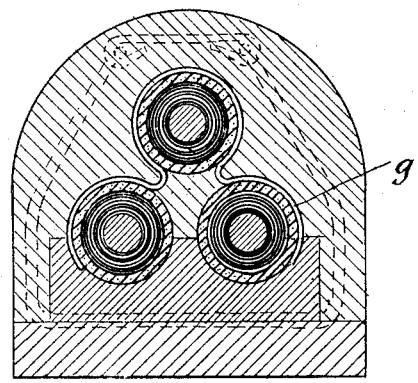
Figure 8:
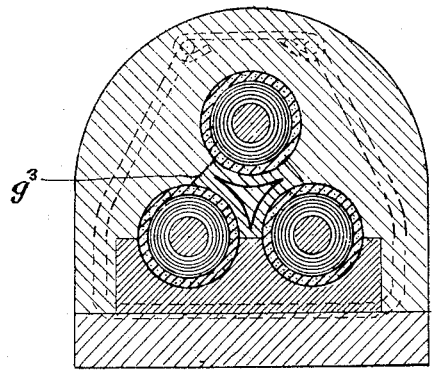

Figures 6 and 7 illustrate respectively forms of clip made of springy or plastic metal and Figure 8 a form of centre piece made of lead or other suitable metal.

Wooden side pieces $a$ are laid extending along the trench, and forming with the base of the trench a former.

Alternatively a former $a^1$ is made of thin bent metal and placed in the trench. When the former is in position molten asphalt is poured into the former and smoothed out flat to form the bottom of the trough as shown at $b$. A length of wire netting $c$ made of expanded metal or any other suitable material and bent to resemble in cross section the letter U, with its base flattened, is then laid along the centre of the trough there being a substantial space between the upright parts of the netting and the sides of the former. The base of the netting is preferably pressed into the molten asphalt to the extent of one half the thickness of the netting as shown at $c^1$. In Figure 2 the netting is shown in dotted lines at $c^2$ its sides standing upright. When the cables are placed in position the sides of the wire netting are bent inwards to meet above the cables, and the edges are joined together, or if preferred the edges may be connected by clips or hooks $c^3$. $d$ are bridge pieces shaped to conform to the under side of the circumference of two cables $e$ and $e^1$, $d^1$ are bridge pieces shaped to conform to the upper sides of the cables $e$ and $e^1$ and to the underside of the cable $e^2$. The three cables are thus located relatively as the apices of an equilateral triangle, the relative position required for known electrical reasons. When the cables are laid and the netting positioned molten asphalt $f$ is poured into the former. This molten asphalt is shaped with a tool as shown in Figures 3, 4 and 5. $g$ is a clip of springy metal, $g^1$ a holder of plastic metal and $g^3$ a centre piece made of lead.

The term "asphalt" where herein used includes as well as natural rock asphalt bituminous material or pitch (which may be either natural or produced as a result of a distillation process) containing intermixed therewith a considerable proportion of mineral matter including (if and so far as required to adjust the physical and heat conducting properties) for example powdered limestone and/or silicious material such as sand.

What I claim is:—

An electrical cable installation adapted to be laid in a trench and comprising a bottom layer of asphalt, a transverse bridge piece resting thereon, insulated electrical cables resting on said bridge pieces in side by side relation, an electrical cable arranged above and in parallel relation to the first mentioned cables, the three cables being in spaced relation to each other and located relatively as the apices of a triangle, bridge pieces positioned in the space separating the cables, and a filler of asphalt in which the cables are embedded, said asphalt filler being reinforced with embedded wire netting.

In witness whereof I have signed this specification.

CHARLES JAMES BEAVER.